United States Patent [19]

Corrigan et al.

[11] Patent Number: 5,466,269
[45] Date of Patent: Nov. 14, 1995

[54] POLYCRYSTALLINE CUBIC BORON NITRIDE ABRASIVE PARTICLES AND ABRASIVE TOOLS MADE THEREFROM

[75] Inventors: Frank Corrigan; Sam Anthony; Barbara Sweeting, all of Franklin, Ohio

[73] Assignee: General Electric Company, Worthington, Ohio

[21] Appl. No.: 983,359

[22] Filed: Nov. 30, 1992

Related U.S. Application Data

[63] Continuation-in-part of Ser. No. 735,503, Jul. 25, 1991, Pat. No. 5,194,071.

[51] Int. Cl.$^6$ .................................................. C09C 1/68
[52] U.S. Cl. .................................................................. 51/307
[58] Field of Search ........................... 51/295, 307, 309; 501/96

[56] References Cited

U.S. PATENT DOCUMENTS

| | | | |
|---|---|---|---|
| 2,137,200 | 11/1938 | Boyer | 51/280 |
| 2,334,048 | 11/1943 | Van der Pyl | 51/206 |
| 2,947,617 | 8/1960 | Wentorf, Jr. | 51/307 |
| 3,081,161 | 3/1963 | Cantrell et al. | 51/298 |
| 3,136,615 | 6/1964 | Bovenkerk et al. | 51/307 |
| 3,212,852 | 10/1965 | Bundy | 23/291 |
| 3,233,988 | 2/1966 | Wentorf, Jr. et al. | 51/307 |
| 3,743,489 | 7/1973 | Wentorf, Jr. et al. | 51/307 |
| 3,767,371 | 10/1973 | Wentorf, Jr. et al. | 51/307 |
| 3,852,078 | 12/1974 | Wakatsuki | 106/43 |
| 3,918,219 | 11/1975 | Wentorf, Jr. et al. | 51/307 |
| 4,016,244 | 4/1977 | Susa et al. | 423/290 |
| 4,188,194 | 2/1980 | Corrigan | 51/307 |
| 4,247,304 | 1/1981 | Morelock | 51/295 |
| 4,289,503 | 9/1981 | Corrigau | 51/309 |
| 4,401,443 | 8/1983 | Lee et al. | 51/307 |
| 4,549,372 | 10/1985 | Sexton et al. | 51/206 R |
| 4,647,546 | 3/1987 | Hall, Jr. et al. | 51/307 |
| 4,923,490 | 5/1990 | Johnson et al. | 51/309 |
| 4,944,772 | 7/1990 | Cho | 51/309 |
| 5,000,760 | 3/1991 | Ohtsubo et al. | 51/293 |
| 5,015,265 | 5/1991 | Corrigan et al. | 51/293 |
| 5,173,091 | 12/1992 | Marek | 51/295 |
| 5,194,071 | 3/1993 | Corrigan et al. | 51/293 |

*Primary Examiner*—Deborah Jones

[57] ABSTRACT

The present invention provides cubic boron nitride abrasives with individual grains of a larger grain size and higher aspect ratios when compared to conventional polycrystalline CBN. These CBN abrasives are obtained from large particle ideal structure hexagonal boron nitride particles of a size 10–1000 μm. These CBN abrasives can be used as particulates or as a compact mass and give improved wear performance over abrasive tools made with conventional CBN abrasives at reduced specific grinding energies.

8 Claims, No Drawings

POLYCRYSTALLINE CUBIC BORON NITRIDE ABRASIVE PARTICLES AND ABRASIVE TOOLS MADE THEREFROM

Cross-Reference to Related Applications

This application is a continuation-in-part of application Ser. No. 07/735,503, filed Jul. 25, 1991, now U.S. Pat. No. 5,194,071, entitled "CUBIC BORON NITRIDE ABRASIVE AND PROCESS FOR PREPARING SAME" and assigned to the same assignee as the present invention.

BACKGROUND OF THE INVENTION

This invention relates to the cubic form of boron nitride and its formation or transformation from the hexagonal form of boron nitride. More particularly, this invention relates to the production of polycrystalline CBN abrasive particles utilizing large-sized HBN powders of an ideal structure and the abrasive tools made from these CBN abrasive particles. The processes used in this invention involve the subjection of large particle boron nitride in the hexagonal form to high pressures and temperatures, either in the absence or presence of catalyst to form cubic boron nitride. The CBN abrasive obtained has an increased grain size and a grain size with a higher aspect ratio, which enhances the performance of abrasive tools made therefrom.

Three crystalline forms of boron nitride are known: (1) hexagonal boron nitride (HBN), a soft graphitic form similar in structure to graphite carbon; (2) wurtzitic boron nitride (WBN), a hard hexagonal form similar to hexagonal diamond; and (3) cubic boron nitride (CBN), a hard zinc blend form similar to cubic diamond. The three boron nitride crystal structures may be visualized as formed by the stacking of a series of sheets or layers of atoms. FIGS. 1-a through 1-c of U.S. Pat. No. 4,188,194 illustrate these three structures in greater detail. In HBN crystals, the boron and nitride atoms bonded together are in the same plane as stacked layers. In the more dense CBN crystal structures, the atoms of the stacked layers are puckered out of plane. In addition, the layers are stacked along the [001] direction in HBN crystals, whereas in the CBN crystal, the layers are stacked along the [111] direction. Furthermore, bonding between the atoms within the layers of an HBN crystal is predominantly of the strong covalent type, with only weak Van der Waals bonding between layers. In CBN crystals, strong, predominantly covalent tetrahedral bonds are formed between each atom and its four neighbors.

Methods for converting HBN into CBN monocrystalline and polycrystalline particles are well known. U.S. Pat. No. 2,947,617 describes a method for preparing cubic boron nitride by the subjection of a hexagonal form of boron nitride, in the presence of a specific additive material, to very high pressures and temperatures. The pressures and temperatures are within the cubic boron nitride stable region defined by the phase diagram of boron nitride. Cubic boron nitride is recovered after removal of the high-pressure and high-temperature condition. The added material or catalyst is selected from the class of alkali metals, alkaline earth metals, tin, lead, antimony and nitrides of these metals. The cubic boron nitride stable region is that represented in FIG. 1 of U.S. Pat. No. 2,947,617 shown above the equilibrium line on the phase diagram therein.

A method for converting HBN to CBN in the absence of catalysts is described in U.S. Pat. No. 3,212,852 under conditions of higher pressures and temperatures. See also: Wakatsuki et al., "Synthesis of Polycrystalline Cubic BN (VI)," and Ichinose et al., "Synthesis of Polycrystalline Cubic BN (V)," both in *Proceedings of the Fourth International Conference of High Pressure,* Kyoto, Japan (1974), pp. 436–445; U.S. Pat. No. 4,016,244; Wakatsuki et al., Japanese Patent No. Sho 49-27518; Wakatsuki et al., Japanese Patent No. Sho 49-30357; Wakatsuki et al., Japanese Patent No. Sho 49-22925; Wakatsuki et al., U.S. Pat. No. 3,852,078; Wakatsuki et al., "Synthesis of Polycrystalline Cubic Boron Nitride," *Mat. Res. Bull.* 7,999–1004 (1972); and Sirota, N., British Patent No. 1,317,716. Such methods are referred to as direct conversion processes.

In all of these processes, hexagonal boron nitride in powder form is used as a starting material. Two forms of hexagonal boron nitride have been identified, the turbostratic structure and the ideal structure. It has been found that the use of large particle ideal structure HBN powders, having an average particle size of about 10 µm or above, improves the packing density of the cell used in high-pressure/high-temperature equipment, thereby improving the yield of CBN. This process is the subject of copending U.S. application Ser. No. 07/735,503, filed Jul. 25, 1991.

It is the cubic form of boron nitride which finds use as an abrasive material typically in the form of a compact such as a cluster compact or a composite compact, or as particles agglomerated together or bonded to a tool body to form an abrasive tool. In a compact, the abrasive crystals are chemically bonded together, typically in a self-bonded relationship. Individual cubic boron nitride particles are physically bonded together in a metal, resin, or vitrified matrix, such as nickel or phenolic resin, to form an abrasive tool such as a grinding wheel. The individual CBN abrasive particles may also be coated with metals such as Ni, Co, Cu and Ti; intermetallics such as Ni—Al and Ni—B; and ceramic composites prior to incorporation into the abrasive tool. Abrasive tools may also be provided by bonding the cubic boron nitride abrasives directly to the surface of a tool body by conventional electroplating techniques, preferably following preparation of the CBN surface with conventional pretreatments. U.S. Pat. Nos. 3,136,615 and 3,233,988 provide a detailed description of certain types of cluster compacts and methods for their manufacture. U.S. Pat. Nos. 3,743,489 and 3,767,371 provide a detailed disclosure of certain types of composite compacts and methods for their manufacture. U.S. Pat. Nos. 3,081,161; 2,137,200; 2,334,048; and 4,549,372 describe examples of abrasive tools comprised agglomerated particles and methods for their manufacture.

The performance of abrasive tools is often quantified by a grinding ratio, which is the ratio of the amount of material removed from a test specimen to the amount of tool lost. Therefore, a high grinding ratio is indicative of good wear performance. The wear performance of abrasive tools is affected by the cutting surface profile and fracture characteristics provided by the abrasive and its retention in the abrasive tool. The profile of the cutting surface is limited by the retention strength of abrasives in the abrasive tool. It is desirable to provide abrasives with characteristics which will enhance the wear performance of abrasive tools and reduce the energy requirements.

SUMMARY OF THE INVENTION

It is an object of this invention to provide polycrystalline CBN abrasives which give abrasive tools with improved wear performance at low specific grinding energies.

It is a further object of this invention to provide CBN abrasive tools with improved grinding ratios.

It is an additional object of this invention to provide CBN abrasive tools which perform at reduced specific grinding energies.

Upon further study of the specification and appended claims, other objects and advantages of this invention will become apparent to those skilled in the art.

It has been discovered that CBN abrasives (particles, compacts) obtained from large particle HBN powders provide abrasive tools which give improved wear performance (grinding ratios) and perform at lower specific energies.

The polycrystalline CBN abrasive compacts of this invention are obtained by converting ideal structure hexagonal boron nitride having an average particle size of about 10 μm or above to a polycrystalline mass of cubic boron nitride. The CBN abrasive particles of this invention are obtained by milling the mass of cubic boron nitride to particles of a desired size from submicron (less than 0.1 μm) to 5000 μm.

The CBN abrasives (particles, compacts) of this invention are comprised of a multitude of individual grains of a grain size in the range of 10–1000 μm, preferably 10–100 μm and these grains preferably have an aspect ratio from 5:1 to 20:1.

DETAILED DESCRIPTION OF THE PREFERRED EMBODIMENT

A starting material for the CBN abrasives of this invention is ideal structure hexagonal boron nitride (HBN) particulates, also referred to as graphitic boron nitride (GBN), having an average particle size of 10 μm or above, typically about 10–1000 μm, more typically 10–100 μm. Particle sizes of 10–50 μm for the HBN particles are preferred and are most preferably 10–35 μm. While HBN particles of 600 μm or more may be used, the use of particles larger than 600 μm may not be economical. Conventional commercially available HBN particles are typically 5–6 μm.

The HBN particles used in this invention may be subjected to conventional Pretreatment steps such as those described in U.S. Pat. No. 4,289,503, where the HBN particles are vacuum-heated and fired to remove volatile impurities, particularly surface oxide contaminants (boron oxide). This vacuum firing is performed at the thermal decomposition temperature or a range of temperatures where, in addition to degassing the surface oxide contaminants, a thin coating of free boron is generated from decomposition on the surfaces of the oxide-free powder particles.

The process of the present invention may be carried out with any conventional high-pressure/high-temperature apparatus. An apparatus of the type described in U.S. Pat. No. 2,941,248 is an example of a satisfactory press. The high-pressure, high-temperature apparatus described therein includes a pair of cemented tungsten carbide punches and an intermediate belt or die member of the same material. The die member has an aperture in which a reaction vessel is positioned.

The reaction vessel in one preferred form includes a hollow-walled cylinder of a material such as talc which (a) is not converted during high-pressure, high-temperature operation to a stronger, stiffer state, and (b) has substantially no volume discontinuities occurring under the application of high pressures and temperatures. Other materials that meet these criteria are well known. The volume of the reaction vessel is small in size. For example, the ratio of the distance between the punch faces to the diameter D of the face portion is less than about 2.0 and preferably below 1.75. Positioned concentrically about the reaction vessel is a graphite electrical resistance heater which, in turn, is positioned within a cylindrical salt liner.

The apparatus includes other components to provide insulation and electrical connection which can vary significantly in configuration... Other apparatus and configurations are capable of providing the required pressures and temperatures for conversion.

These HBN particles are converted to polycrystalline CBN under conventional high-pressure and high-temperature conditions. The term "conversion" is employed generically to denote the change or changes which occur in the hexagonal form of boron nitrides to the cubic form of boron nitride. Conversion reactions wherein the crystal structure of the hexagonal form of boron nitride is caused to change directly to a cubic form of boron nitride crystal structure with a catalyst material to facilitate the process are included.

The pressure temperature curve of the boron-nitride phase diagram indicate to a varying degree maximum temperature limits within which the cubic boron nitride-forming reaction may take place. While as a practical matter, economics would dictate the use of temperatures and pressures not too far above the indicated minimums, it is evident from the curve that there is an ample pressure and temperature range within which the best mode of carrying out the invention can be practiced.

Examples of suitable procedures for the conversion to cubic boron nitride are described in U.S. Pat. No. 2,947,617. Typically, a pyrophyllite reaction vessel containing ideal structure hexagonal boron nitride and a catalyst is placed in the reaction chamber of a high-pressure/high-temperature apparatus where compression of oppositely positioned concentric frustoconical punches raises the pressure to a desired level and the temperature required is obtained by (1) induction heating, (2) passing an electrical current through the starting material or (3) winding heating coils around the reaction vessel. Pressures and temperatures are adjusted to provide reaction conditions above the hexagonal boron nitride-cubic boron nitride equilibrium line on the phase diagram of boron nitride. Cubic boron nitride is recovered upon returning the reaction vessel to ambient conditions. The ideal structure HBN is compacted into the cylindrical aperture defined by two punches and subjected to pressures of 20,000–100,000 atms.

In converting ideal structure hexagonal boron nitride to cubic boron nitride by the method of the present invention, it is difficult to measure the pressure and temperature to which the reactants are subjected by direct means because of the extreme pressures employed. Therefore, each of the conditions is measured by indirect means. In measuring the pressure, recognition is made of the fact that certain metals undergo distinct changes in electrical resistance at particular pressures. Thus, bismuth undergoes a phase change at 24,800 atmospheres, thallium undergoes such a change at 43,500 atmospheres, cesium undergoes such a change at 53,500 atmospheres and barium undergoes such a change at 77,400 atmospheres. By determining the hydraulic pressure load necessary to cause a phase change in a metal such as bismuth, a point on the pressure-pressload curve is determined. By carrying out the same operation with other metals such as thallium, cesium and barium, whose phase-change points are known, a series of points on a pressure-pressload curve are obtained.

The melting point of germanium varies directly with pressure over an extremely wide pressure range. The change in melting point for germanium with pressure has been found to be a straight line when the pressure is determined by the pressure-pressload curves described above. Therefore, by applying other pressloads to a reaction vessel filled with germanium and determining the melting point of germanium, the actual pressure in the chamber at a given pressload can be determined.

The temperature in the reaction vessel can be determined by conventional means such as by placing a thermocoupling juncture in the reaction vessel and measuring the temperatures of the function in the usual manner. Electrical energy at a predetermined rate is supplied to the apparatus and a temperature produced by this power is measured by the thermocouple assembly. This same procedure is repeated a number of times with different power inputs to produce a calibration curve of power input versus temperature in the reaction vessel. After a calibration of the apparatus is obtained by this method, the temperature of the contents of the reaction vessel is determined by the power input to the apparatus in conjunction with the calibration curve. In general, to produce a temperature of about 1800° C. in the apparatus described in U.S. Pat. No. 2,941,248, an alternating current voltage of about one to three volts at a current from about 200–600 amperes is used to deliver the required 600–700 watts through the graphite heating tube.

The reaction mixture used in the process of the present invention essentially comprises ideal structure HBN particles but it can additionally contain a catalyst or conventional additives. Additives include CBN crystals which are introduced before conversion of the HBN. Where the additive used is CBN crystals, the amount can range from 1–50% by weight of the total weight of the pressed pill formed and/or the reaction medium. Where a catalyst is used, the ratio of the catalyst material to the hexagonal boron nitride may vary within extremely wide limits, preferably from 0.05–40 wt.%. However, in order to have an efficient reaction, the amount of boron nitride present should be sufficient to provide the nitrogen required for complete conversion of the metallic catalyst to the catalyst nitride.

It is believed that the catalyst is first converted to its nitride and the remaining boron nitride dissolves in the catalyst nitride and is subsequently reprecipitated as cubic boron nitride. When the catalyst employed is a nitride, there is no limitation on the relative amounts of the catalyst nitride and the boron nitride employed. Suitable catalysts include those well known in the art such as those selected from the class of alkali metals, alkaline earth metals, tin, lead, antimony and the carbide, oxide, borides and nitrides of these metals.

Various bonding or electrical conducting agents such as metals, for example, may be mixed with boron nitride as a starting material for electrical conducting properties. With such a reaction mixture, the use of capacitor discharge-type heating provides higher temperatures and higher pressures within the apparatus before extensive melting or decomposition takes place. Thus, the metal walls of the apparatus are not subjected to such extreme and injurious temperatures.

The cubic boron nitride mass (compact) obtained upon conversion of the large particle HBN has some characteristics consistent with and some superior to conventional CBN masses. The CBN compacts of the present invention are widely applicable for industrial purposes in the same manner as other conventional CBN masses. For example, as abrading or cutting materials. The process used to prepare the CBN mass has the advantage that the HBN starting material allows for increased packing density within the cell of high-pressure/high-temperature apparatus with a resulting increase in yield of the mass. The increased mass also allows for a decrease in the press-stroke necessary during the conversion process.

The ideal structure HBN particles used to form the polycrystalline CBN mass may be in the form of a pressed-pill. The pressed-pill may contain conversion catalysts where desired and/or conventional additives such as CBN crystals. The density of the pressed-pill will vary with the quantity and density of these additive materials. Where little or no catalyst or additives are used, such pressed-pills have a density greater than 2.00gm/cc, which is higher than pressed-pills obtained from conventionally sized HBN particles of 5–6 μm. To form the pressed-pill, the HBN particles are compressed at low temperature, preferably at ambient temperature. The pressed-pill allows for easy handling in the high-pressure/high-temperature apparatus used to convert the HBN therein to a CBN polycrystalline mass.

To obtain the CBN particulates of this invention, the polycrystalline mass (compact) of cubic boron nitride formed upon conversion of the large HBN particles is milled by conventional techniques. The CBN particles obtained vary in size and are distributed over a wide range, typically with the majority of the particles falling within the range from submicron (less than 0.1 μm) to 5000 μm.

The polycrystalline CBN abrasive particles of this invention can be coated with a protective metal or one used to aid bonding within a matrix. Conventional coating materials such as titanium, copper, etc., are suitable. The polycrystalline CBN abrasive particles of this invention provide improved wear performance in abrasive tools such as grinding wheels. Although not wishing to be bound by theory, it is believed that the large crystal HBN produces CBN abrasive compacts and particles of a unique crystal structure that allows for improved fracture characteristics at the cutting surface of the tool without loss of the retention strength of the abrasive within the bond of the abrasive tool. It is also believed that the internal grains of the CBN abrasive compacts and particles of this invention are highly oriented with respect to each other, and that this also affects the breakdown characteristics of the abrasive tools made therefrom in a favorable manner.

The abrasive tools of this invention include those which incorporate the cubic boron nitride abrasive particles and compacts described above. The particles are agglomerated by conventional means using conventional metal and/or resin bonding matrices to form tools such as grinding wheels. Alternatively, these particles are bonded to a tool body by conventional electroplating techniques. The compacts can be bonded to tool bodies by conventional techniques as well.

The bond material used to agglomerate these particles is determined by the intended use of the abrasive tool. The abrasive tool may also contain other, more conventional CBN particles and it may also contain other additives. The proportion of CBN particles used determines the breakdown characteristics of the tool.

The average particle size of the CBN particles used to form the abrasive tools can vary widely, i.e., from submicron size (below 0.1 μm) to 5000 μm, and the size preferred depends on the end use.

Grinding tools have been obtained which give grinding ratios more than two times that obtained from grinding tools comprised of conventional CBN particles. This superior grinding performance is obtained with reduced energy requirements.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius; and, unless otherwise indicated, all parts and percentages are by weight.

The entire disclosures of all applications, patents and publications, cited above and below, are hereby incorporated by reference.

EXAMPLE

Example 1

Packing density tests were made with (a) large particle (30 µm average particle size) ideal structure HBN powder and (b) small particle (less than 10 µm, about 5–6 µm average particle size) ideal structure HBN powder currently used in conventional conversion processes. Comparisons were made with (1) the powder in the as received form, (2) after vacuum firing in the thermal decomposition range, and (3) with vacuum-fired powders mixed with 20 wt.% crystal CBN.

The density measurements were made by packing the powders in a hardened steel mold and plunger set with a Carver press to form a press-pill. A set quantity of each powder (8.0 g) was weighed and inserted into the mold and pressed at a set force (21,000 lbs –63,000 psi on the 0.65" plunger). After force release, the pressed powder was pushed from the mold into a bushing/heater assembly (0.65" diameter) and the pressed-pill height in the assembly was measured, allowing the density to be calculated. The results are shown below:

|  | Density (grams/cm³) | % Theoretical |
| --- | --- | --- |
| Unfired Ideal Structure HBN Powder | | |
| Large Particle HBN | 2.07 | 90.8 |
| Small Particle HBN | 1.89 | 82.9 |
| Theoretical | 2.28 | — |
| Fired Ideal Structure HBN Powder | | |
| Fired Large Particle HBN | 2.07 | 90.8 |
| Fired Small Particle HBN | 1.84 | 80.7 |
| Theoretical | 2.28 | — |
| HBN/CBN Powder Mixture | | |
| 80% Fired Large Particle HBN/ 20% CBN Additive | 2.19 | 86.9 |
| 80% Fired Small Particle HBN/ 20% CBN Additive | 1.98 | 78.6 |
| Theoretical | 2.52 | — |

The results show consistent improvement in the pill density obtained with large particle HBN. Samples of packed, vacuum-fired powder of a large particle size were pressed at high-temperature/high-pressure conditions for conversion to CBN yielding well-sintered crystalline CBN slugs.

Example 2

A quantity of the large crystal size HBN powder (about 40 µm average particle size) is vacuum-fired into the thermal decomposition range resulting in a weight loss of approximately 1.5%. The vacuum-fired powder is loaded into high-pressure cells at the rate of 8 g per cell. The loaded cells are placed in a high-pressure-belt-type apparatus and pressed at pressure and temperature conditions sufficient to result in conversion of the powder to sintered CBN compact masses. A total of 678 g of the sintered CBN product is produced predominately in the form of cylindrical slugs. The slugs are milled to obtain mesh-sized particles. The milled powder is then acid cleaned (sulfuric/hydrofluoric mix) and sieved to size. The 120/140 mesh size fraction is nickel-coated for grinding wheel fabrication and testing.

The following table describes results of wet grinding tests with 7 in. ×0.25 in. resin bonded grinding wheels of CBN abrasives of this invention produced as described above and two commercially available CBN abrasives, CBN 520 and CBN 560. These particles are sieved to the same mesh size as those of the invention described above. The results described below are averages of tests on two wheels produced with the CBN of the present invention, two wheels produced with CBN 520, and four wheels with CBN 560.

| Test Conditions | |
| --- | --- |
| Machine | Brown & Sharp ⁵⁄₂₄, 15 HP CNC surface grinder |
| Wheel Speed | 5500 sfpm (28 m/sec) |
| Table Speed | 50 FPM (15 m/min) |
| Crossfeed | 0.125" (3.2 mm) |
| Downfeed | 0.001" (0.025 mm) |
| Coolant | Cimperial HD90 at 5% in water |
| Workpiece | M4HSS (HRC 60–62) |

| Grinding Test Results | | | |
| --- | --- | --- | --- |
| Abrasive Type | Grinding Ratio* | Specific Energy W-hr/cc | Power Range kW |
| CBN of this invention | 771 | 17.0 | 1.0–1.4 |
| CBN 560 | 358 | 21.2 | 1.2–2.8 |
| CBN 520 | 356 | 21.0 | 1.2–1.8 |

*Volume of workpiece removed/volume of wheel wear.

The results show improved performance with the CBN abrasives of the present invention in both the grinding ratio and energy requirements.

The preceding examples can be repeated with similar success by substituting the generically or specifically described CBN particles, additive components and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A polycrystalline cubic boron nitride (CBN) abrasive compact, obtained by converting a pressed pill having a density greater than 2.00 gm/cc and comprising catalyst material and hexagonal boron nitride (HBN) particles having an average particle size of 10–1000 µm to a mass of polycrystalline cubic boron nitride under conditions of high pressure and temperature sufficient to convert HBN to CBN.

2. A polycrystalline CBN abrasive compact as in claim 1, which is coated with a metallic, intermetallic, or ceramic protective coating.

3. An abrasive tool comprised of polycrystalline cubic boron nitride (CBN) abrasive obtained by converting a pressed pill having a density greater than 2.00 gm/cc and comprising catalyst material and hexagonal boron nitride (HBN) particles having an average particle size of 10–1000 µm to a mass of polycrystalline cubic boron nitride under conditions of high pressure and temperature sufficient to convert HBN to CBN.

4. An abrasive tool as in claim 3, wherein the polycrystalline CBN abrasive comprises particles of a size in the range of 0.1–5000 µm.

5. An abrasive tool as in claim 4, which is a grinding wheel.

6. An abrasive tool as in claim 1, wherein the polycrystalline CBN abrasive has a grain size in the range of 10–1000 µm and said grains have an aspect ratio of from 5:1 to 20:1.

7. An abrasive tool as in claim 1, wherein the polycrystalline CBN abrasive is a compact bonded to a tool body.

8. An abrasive tool as in claim 7, which is a drill bit or dressing tool.

* * * * *